(12) United States Patent
Oh et al.

(10) Patent No.: US 11,876,259 B2
(45) Date of Patent: Jan. 16, 2024

(54) COMPOSITE HOLLOW FIBER MEMBRANE, MANUFACTURING METHOD THEREFOR, HOLLOW FIBER MEMBRANE CARTRIDGE INCLUDING SAME, AND FUEL CELL MEMBRANE HUMIDIFIER

(71) Applicant: KOLON INDUSTRIES, INC., Seoul (KR)

(72) Inventors: Young Seok Oh, Seoul (KR); Kyoung Ju Kim, Seoul (KR); Na Hyeon An, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 606 days.

(21) Appl. No.: 15/734,266

(22) PCT Filed: Jun. 12, 2019

(86) PCT No.: PCT/KR2019/007039
§ 371 (c)(1),
(2) Date: Dec. 2, 2020

(87) PCT Pub. No.: WO2019/240481
PCT Pub. Date: Dec. 19, 2019

(65) Prior Publication Data
US 2021/0154624 A1    May 27, 2021

(30) Foreign Application Priority Data
Jun. 12, 2018    (KR) .................. 10-2018-0067556

(51) Int. Cl.
*H01M 8/04*    (2016.01)
*H01M 8/04119*    (2016.01)
(Continued)

(52) U.S. Cl.
CPC ...... *H01M 8/04126* (2013.01); *B01D 53/228* (2013.01); *B01D 63/021* (2013.01);
(Continued)

(58) Field of Classification Search
CPC ......... H01M 8/04126; H01M 8/04089; H01M 8/04141; H01M 8/04149; B01D 63/021; B01D 2053/224; B01D 2325/02
(Continued)

(56) References Cited

U.S. PATENT DOCUMENTS 5,009,678 A    4/1991   Bikson
5,258,202 A    11/1993  Pellegrino
(Continued)

FOREIGN PATENT DOCUMENTS

CN    105813667 A    7/2016
DE    102014205029 A1    9/2015
(Continued)

OTHER PUBLICATIONS

CN office action dated Feb. 17, 2022.
(Continued)

*Primary Examiner* — James M Erwin
(74) *Attorney, Agent, or Firm* — Harvest IP Law, LLP

(57) ABSTRACT

The present invention relates to a composite hollow fiber membrane, a manufacturing method therefor, a hollow fiber membrane cartridge including same, and a fuel cell membrane humidifier, the composite hollow fiber membrane comprising a hollow fiber membrane and a contaminant collection layer coated on the inner surface of the hollow fiber membrane. The composite hollow fiber membrane can prevent performance deterioration of a fuel cell by removing, without a separate gas filtering device, contaminants such as nitrogen oxide ($NO_x$), sulfur oxide ($SO_x$), and ammonia ($NH_3$) during a humidifying process.

19 Claims, 5 Drawing Sheets

(51) Int. Cl.
  *B01D 53/22* (2006.01)
  *B01D 63/02* (2006.01)
  *B01D 67/00* (2006.01)
  *H01M 8/04089* (2016.01)

(52) U.S. Cl.
  CPC .... *B01D 67/0088* (2013.01); *H01M 8/04089* (2013.01); *H01M 8/04141* (2013.01); *H01M 8/04149* (2013.01); *B01D 2053/224* (2013.01); *B01D 2313/40* (2013.01); *B01D 2325/02* (2013.01)

(58) Field of Classification Search
  USPC .......................................................... 429/413
  See application file for complete search history.

(56) References Cited

U.S. PATENT DOCUMENTS

| | | | |
|---|---|---|---|
| 9,553,323 B2 | 1/2017 | Isom et al. | |
| 2008/0197070 A1* | 8/2008 | Sirkar | B01D 69/125 210/500.27 |
| 2015/0273390 A1 | 10/2015 | Yeom | |
| 2016/0101390 A1* | 4/2016 | Chen | B01D 71/022 210/500.21 |
| 2018/0145357 A1* | 5/2018 | Coms | H01M 8/04149 |

FOREIGN PATENT DOCUMENTS

| | | |
|---|---|---|
| DE | 102014221241 A1 | 4/2016 |
| JP | 2000015066 A | 1/2000 |
| JP | 2011146175 A | 7/2011 |
| KR | 20010001022 A | 1/2001 |
| KR | 20010006122 A | 1/2001 |
| KR | 20010006128 A | 1/2001 |
| KR | 20010021217 A | 3/2001 |
| KR | 20010026696 A | 4/2001 |
| KR | 20010063366 A | 7/2001 |
| KR | 20090013304 A | 2/2009 |
| KR | 20090057773 A | 6/2009 |
| KR | 20090128005 A | 12/2009 |
| KR | 20150044678 A | 4/2015 |
| KR | 20160141499 A | 12/2016 |
| WO | 2010104097 A1 | 9/2010 |
| WO | 2017040761 A1 | 3/2017 |

OTHER PUBLICATIONS

International Search Report dated Sep. 23, 2019.
EP Search report dated Feb. 8, 2022.
JP office action dated Jun. 30, 2022.
JP office action dated Dec. 14, 2021.

* cited by examiner

COMPOSITE HOLLOW FIBER MEMBRANE, MANUFACTURING METHOD THEREFOR, HOLLOW FIBER MEMBRANE CARTRIDGE INCLUDING SAME, AND FUEL CELL MEMBRANE HUMIDIFIER

CROSS REFERENCE TO RELATED APPLICATIONS

This application is a National Stage of International Application No. PCT/KR2019/007039 filed Jun. 12, 2019, claiming priority based on Korean Patent Application No. 10-2018-0067556 filed Jun. 12, 2018.

TECHNICAL FIELD

The present disclosure relates to a composite hollow fiber membrane, a method of manufacturing the same, and a hollow fiber membrane cartridge and a fuel cell membrane humidifier including the same, and more particularly to a composite hollow fiber membrane capable of removing a gas, such as nitrogen oxide ($NO_x$), sulfur oxide ($SO_x$), or ammonia ($NH_3$), during a humidification process without a separate gas filtering device, thereby preventing deterioration in performance of a fuel cell, a method of manufacturing the same, and a hollow fiber membrane cartridge and a fuel cell membrane humidifier including the same.

BACKGROUND ART

A fuel cell is a power generation cell that combines hydrogen and oxygen to generate electricity. Such a fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the volume of a pollutant that is discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may be generally classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors to improve the performance of the polymer electrolyte membrane fuel cell is to supply a predetermined amount or more of moisture to a polymer electrolyte membrane (PEN) (also referred to as a proton exchange membrane) of a membrane electrode assembly (MEA) in order to retain moisture content. The reason for this is that, in the case in which the polymer electrolyte membrane becomes dry, power generation efficiency is abruptly reduced.

1) A bubbler humidification method of filling a pressure-resistant container with water and allowing a target gas to pass through a diffuser in order to supply moisture, 2) a direct injection method of calculating the amount of moisture that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane.

Among these methods, the membrane humidification method, which provides water vapor to a gas that is supplied to the polymer electrolyte membrane using a membrane configured to selectively transmit only water vapor included in an exhaust gas in order to humidify the polymer electrolyte membrane, is advantageous in that it is possible to reduce the weight and size of a humidifier.

In the case in which a module is formed, a hollow fiber membrane having large transmission area per unit volume is preferably used as the selective transmission membrane used in the membrane humidification method. That is, in the case in which a membrane humidifier is manufactured using a hollow fiber membrane, high integration of the hollow fiber membranes having large contact surface area is possible, whereby it is possible to sufficiently humidify a fuel cell even in the case of a small capacity, it is possible to use a low-priced material, and it is possible to collect moisture and heat included in off-gas discharged from the fuel cell at a high temperature and to reuse the collected moisture and heat through the humidifier.

At this time, in a fuel cell system, high-temperature air supplied from a compressor or a blower is introduced into a stack via the humidifier. In the case in which a pollutant, such as nitrogen oxide ($NO_x$), sulfur oxide ($SO_x$), or ammonia ($NH_3$), included in the air are introduced into the stack of the fuel cell, performance of the stack may be deteriorated. Consequently, a separate gas filtering device capable of removing such a pollutant is used at the front end or the rear end of the compressor/blower.

DISCLOSURE

Technical Problem

It is an object of the present disclosure to provide a composite hollow fiber membrane capable of removing a pollutant, such as nitrogen oxide ($NO_x$), sulfur oxide ($SO_x$), or ammonia ($NH_3$), during a humidification process without a separate gas filtering device, thereby preventing deterioration in performance of a fuel cell.

It is another object of the present disclosure to provide a method of manufacturing the composite hollow fiber membrane.

It is another object of the present disclosure to provide a hollow fiber membrane cartridge including the composite hollow fiber membrane.

It is a further object of the present disclosure to provide a fuel cell membrane humidifier including the composite hollow fiber membrane.

Technical Solution

According to an embodiment of the present disclosure, there is provided a composite hollow fiber membrane including a hollow fiber membrane and a pollutant entrapping layer coated on the inner surface of the hollow fiber membrane, the pollutant entrapping layer being configured to remove a pollutant from air flowing along a lumen of the hollow fiber membrane. The pollutant includes nitrogen oxide, sulfur oxide, ammonia, or a mixture of two or more thereof.

The pollutant entrapping layer may include biochar, charcoal, active carbon, or a mixture of two or more thereof.

Alternatively or additionally, the pollutant entrapping layer may include at least one acidic polymer selected from the group consisting of poly(perfluorosulfonic acid) (PFSA), sulfonated polyethersulfone (S-PES), sulfonated polyarylethersulfone (S-PAES), sulfonated polystyrene (S-PS), sulfonated polyetherketone (S-PEK), and sulfonated polyetheretherketone (S-PEEK).

The pollutant entrapping layer may be present in the composite hollow fiber membrane in an amount of 1 wt % to 50 wt % based on the total weight of the composite hollow fiber membrane.

The average pore size of the hollow fiber membrane may be 0.1 nm to 100,000 nm, the average pore size of the composite hollow fiber membrane may be 0.05 nm to 90,000 nm, and the ratio of the average pore size of the composite hollow fiber membrane to the average pore size of the hollow fiber membrane may be 50% or more.

The porosity of the hollow fiber membrane may be 50% to 90%, the porosity of the composite hollow fiber membrane may be 45% to 85%, and the ratio of the porosity of the composite hollow fiber membrane to the porosity of the hollow fiber membrane may be 94.4% or more.

According to another embodiment of the present disclosure, there is provided a method of manufacturing a composite hollow fiber membrane, the method including preparing a hollow fiber membrane and coating a coating mixture including a pollutant entrapping material on the inner surface of the hollow fiber membrane in order to remove a pollutant from air flowing along a lumen of the hollow fiber membrane. The pollutant includes nitrogen oxide, sulfur oxide, ammonia, or a mixture of two or more thereof.

The coating mixture may be a solution including the pollutant entrapping material dissolved in a solvent or a dispersion including the pollutant entrapping material dispersed in a dispersion medium.

The coating mixture may include 1 wt % to 30 wt % of the pollutant entrapping material based on the total weight of the coating mixture.

The coating may include circulating the coating mixture through the lumen of the hollow fiber membrane.

The method may further include preparing a hollow fiber membrane bundle using a plurality of hollow fiber membranes, and manufacturing a hollow fiber membrane module, the hollow fiber membrane bundle being disposed in the hollow fiber membrane module in such a way that a first fluid flows along the lumens of the hollow fiber membranes and a second fluid flows outside the hollow fiber membranes, wherein the coating may be performed after the hollow fiber membrane module is manufactured.

The viscosity of the coating mixture may be 50 to 10,000 cps, and the coating mixture may be circulated at a flow rate of 0.1 to 30 LPM.

The coating may further include circulating dry air outside the hollow fiber membranes after the circulating the coating mixture.

The circulating the dry air may be performed by circulating the dry air having a temperature of 10° C. to 150° C. at a flow rate of 1 to 1,000 LPM.

According to another embodiment of the present disclosure, there is provided a hollow fiber membrane cartridge including a plurality of composite hollow fiber membranes and a body portion in which the plurality of composite hollow fiber membranes are accommodated, wherein each of the composite hollow fiber membranes includes a hollow fiber membrane and a pollutant entrapping layer coated on the inner surface of the hollow fiber membrane, the pollutant entrapping layer being configured to remove a pollutant from air flowing along a lumen of the hollow fiber membrane. The pollutant includes nitrogen oxide, sulfur oxide, ammonia, or a mixture of two or more thereof.

According to a further embodiment of the present disclosure, there is provided a membrane humidifier for a fuel cell, the membrane humidifier including: a housing unit including a first fluid inlet configured to allow a first fluid to be introduced therethrough, a first fluid outlet configured to allow the first fluid to be discharged therethrough, a second fluid inlet configured to allow a second fluid to be introduced therethrough, and a second fluid outlet configured to allow the second fluid to be discharged therethrough; and a plurality of composite hollow fiber membranes configured to perform moisture exchange between the first and second fluids, the composite hollow fiber membranes being installed in the housing unit in such a way that the first fluid flows along lumens of the composite hollow fiber membranes and the second fluid flows outside the composite hollow fiber membranes, wherein one of the first and second fluids is low-humidity air to be supplied from outside and humidified through the moisture exchange, and each of the composite hollow fiber membranes includes a hollow fiber membrane and a pollutant entrapping layer coated on one of outer and inner surfaces of the hollow fiber membrane, at which the low-humidity air is supposed to flow, such that the pollutant entrapping layer can directly contact the low-humidity air and remove a pollutant from the low-humidity air, the pollutant including nitrogen oxide, sulfur oxide, ammonia, or a mixture of two or more thereof.

The pollutant entrapping layer may include biochar, charcoal, active carbon, or a mixture of two or more thereof.

The first fluid flowing along the lumens of the composite hollow fiber membranes may be the low-humidity air, and the pollutant entrapping layer may be coated on the inner surface of the hollow fiber membrane.

Advantageous Effects

A composite hollow fiber membrane according to the present disclosure is capable of removing a gas, such as nitrogen oxide ($NO_x$), sulfur oxide ($SO_x$), or ammonia ($NH_3$), during a humidification process without a separate gas filtering device, thereby preventing deterioration in performance of a fuel cell.

BEST MODE

Figure 1:
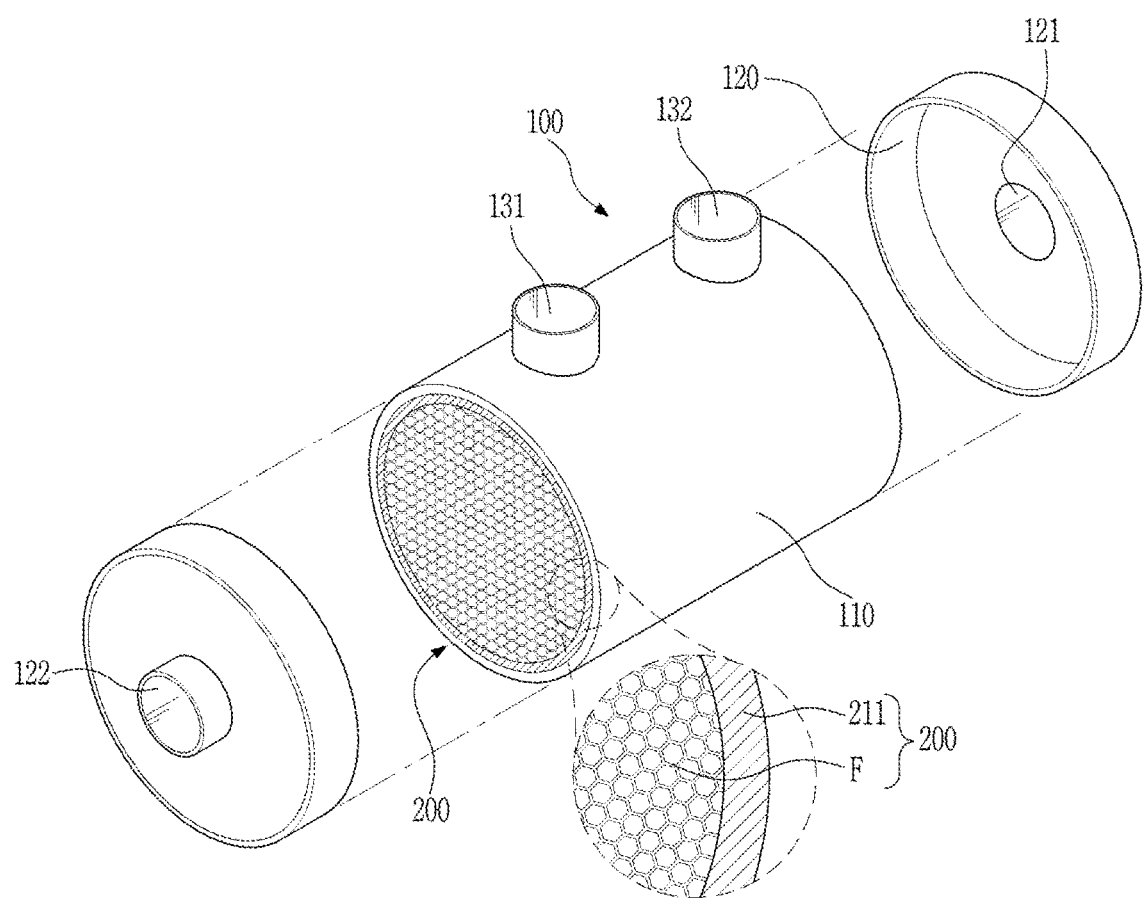
FIG. 1 is a perspective view schematically showing a fuel cell membrane humidifier according to an embodiment of the present disclosure.

The present disclosure may be changed in various manners and may have various embodiments, wherein specific embodiments will be illustrated and described in detail in the following detailed description. However, the present disclosure is not limited to the specific embodiments, and it should be understood that the present disclosure includes all modifications, equivalents, or substitutions included in the idea and technical scope of the present disclosure.

The terms used in the present disclosure are provided only to describe the specific embodiments, and do not limit the present disclosure. Singular forms are intended to include plural forms as well, unless the context clearly indicates otherwise. In the present disclosure, it should be understood that the terms "includes," "has," etc. specify the presence of features, numbers, steps, operations, elements, components, or combinations thereof described in the specification, but do not preclude the presence or addition of one or more other features, numbers, steps, operations, elements, components, or combinations thereof.

A composite hollow fiber membrane according to an embodiment of the present disclosure includes a hollow fiber membrane and a pollutant entrapping layer coated on the inner surface of the hollow fiber membrane, the pollutant entrapping layer being configured to remove a pollutant from air that flows along a lumen of the hollow fiber membrane.

The pollutant to be removed by the pollutant entrapping layer may include nitrogen oxide ($NO_x$), sulfur oxide ($SO_x$), ammonia ($NH_3$), or a mixture of two or more thereof.

The term "hollow fiber membrane" used in this specification means a normal hollow fiber membrane, which is a component of a composite hollow fiber membrane, unless explicitly stated as the "composite hollow fiber membrane." In addition, the hollow fiber membrane may be a "single-layered hollow fiber membrane" or a "braid-reinforced hollow fiber membrane." The material for the hollow fiber membrane (the material for a polymer film coated on the outer surface of a tubular braid in the case of the braid-reinforced hollow fiber membrane) is not restricted as long as the material is capable of selectively transmitting moisture. For example, the hollow fiber membrane may include polysulfone, polyethersulfone, poly arylene sulfone, poly arylene ether sulfone, polyimide, polyetherimide, polyamide imide, polyvinyl alcohol, polyacrylonitrile, polyvinylidene difluoride (PVDF), tetrafluoroethylene-perfluoro-dioxa-methyl-octenesulfonic acid copolymer, a copolymer thereof, or a mixture thereof.

The inner surface of the hollow fiber membrane, on which the pollutant entrapping layer is coated, means the surface of the hollow fiber membrane that faces the lumen of the hollow fiber membrane.

Since the composite hollow fiber membrane includes the pollutant entrapping layer, it is possible to entrap a pollutant, such as nitrogen oxide ($NO_x$), sulfur oxide ($SO_x$), or ammonia ($NH_3$), during a humidification process without a separate gas filtering device, whereby it is possible to prevent deterioration in performance of a fuel cell. That is, in a fuel cell system, high-temperature air supplied from a compressor or a blower is introduced into a stack via a humidifier. In the case in which a pollutant, such as nitrogen oxide (Nm, e.g. nitric oxide (NO), nitrogen dioxide ($NO_2$), dinitrogen monoxide ($N_2O$), dinitrogen trioxide ($N_2O_3$), dinitrogen tetroxide ($N_2O_4$), or dinitrogen pentoxide ($N_2O$), sulfur oxide ($SO_x$), e.g. sulfur dioxide ($SO_2$), sulfur trioxide ($SO_3$), sulfurous acid ($H_2SO_3$), or sulfuric acid ($H_2SO_4$), or ammonia ($NH_3$), included in the air are introduced into the stack of the fuel cell, performance of the stack may be deteriorated. In the present disclosure, the pollutant is entrapped by the pollutant entrapping layer included in the composite hollow fiber membrane at the time of humidifying the air (i.e. the pollutant is removed from the air before the air is introduced into the stack), whereby it is possible to prevent deterioration in performance of the fuel cell.

The pollutant entrapping layer may include biochar, charcoal, active carbon, or a mixture of two or more thereof as a pollutant entrapping material.

At this time, the particle size of pollutant entrapping material may be 0.1 μm to 50 μm, specifically 0.1 μm to 5 μm. In the case in which the particle size of the pollutant entrapping material deviates from the above range, the pollutant entrapping material may be lost due to flow thereof or pollutant entrapping efficiency of the pollutant entrapping layer may be reduced.

Alternatively or additionally, the pollutant entrapping layer may include at least one acidic polymer selected from the group consisting of poly(perfluorosulfonic acid) (PFSA), sulfonated polyethersulfone (S-PES), sulfonated polyarylethersulfone (S-PAES), sulfonated polystyrene (S-PS), sulfonated polyetherketone (S-PEK), and sulfonated polyetheretherketone (S-PEEK).

At this time, the thickness of pollutant entrapping layer may be 0.1 μm to 30 μm, specifically 1 μm to 10 μm. In the case in which the thickness of pollutant entrapping layer is less than 0.1 μm, pollutant entrapping efficiency may be reduced. In the case in which the thickness of pollutant entrapping layer is greater than 30 μm, humidification performance may be reduced.

The pollutant entrapping layer may be present in the composite hollow fiber membrane in an amount of 1 wt % to 50 wt %, specifically 5 wt % to 20 wt %, based on the total weight of the composite hollow fiber membrane. In the case in which the content of the pollutant entrapping layer is less than 1 wt % based on the total weight of the composite hollow fiber membrane, pollutant entrapping efficiency may be reduced. In the case in which the content of the pollutant entrapping layer is greater than 50 wt % based on the total weight of the composite hollow fiber membrane, mechanical properties of the composite hollow fiber membrane may be reduced.

Meanwhile, as will be described below, the composite hollow fiber membrane may be manufactured by circulating a coating mixture including the pollutant entrapping material through the lumen of the hollow fiber membrane. At this time, dry air is forced to flow outside the hollow fiber membrane such that moisture exchange is performed to form the pollutant entrapping layer. That is, it is possible to prevent pores of the hollow fiber membrane from being blocked by the pollutant entrapping layer or the porosity of the hollow fiber membrane from being changed by forming the pollutant entrapping layer while moisture exchange is performed. According to the embodiment of the present disclosure, therefore, it is possible to efficiently entrap a pollutant through the pollutant entrapping layer of the composite hollow fiber membrane without a reduction in humidification efficiency.

As a result, there may be no great difference between the hollow fiber membrane and the composite hollow fiber membrane in terms of average pore size and porosity.

Specifically, the average pore size of the hollow fiber membrane may be 0.1 nm to 100,000 nm, specifically 0.4 nm to 30,000 nm, and the porosity of the hollow fiber membrane may be 50% to 90%, specifically 65% to 85%. In the case in which the average pore size of the hollow fiber membrane is less than 0.1 nm, humidification performance may be reduced. In the case in which the average pore size of the hollow fiber membrane is greater than 100,000 nm, the physical strength of the composite hollow fiber membrane may be reduced. Also, in the case in which the porosity of the hollow fiber membrane is less than 50%, humidification performance may be reduced. In the case in which the porosity of the hollow fiber membrane is greater than 90%, the physical strength of the composite hollow fiber membrane may be reduced.

In addition, the average pore size of the composite hollow fiber membrane may be 0.05 nm to 90,000 nm, specifically 0.4 nm to 30,000 nm, and the porosity of the composite hollow fiber membrane may be 45% to 85%, specifically 63% to 83%. In the case in which the average pore size of the composite hollow fiber membrane is less than 0.05 nm, humidification performance may be reduced. In the case in which the average pore size of the composite hollow fiber membrane is greater than 90,000 nm, the physical strength of the composite hollow fiber membrane may be reduced. Also, in the case in which the porosity of the hollow fiber membrane is less than 45%, humidification performance may be reduced. In the case in which the porosity of the hollow fiber membrane is greater than 85%, the physical strength of the composite hollow fiber membrane may be reduced.

Consequently, variation in the average pore size depending on coating of the pollutant entrapping layer may be 50% or less, specifically 10% to 50% (i.e. the ratio of the average pore size of the composite hollow fiber membrane to the average pore size of the hollow fiber membrane may be 50% or more, specifically 50% to 90%). In addition, variation in the porosity depending on coating of the pollutant entrapping layer may be 5.6% or less, specifically 1% to 3% (i.e. the ratio of the porosity of the composite hollow fiber membrane to the porosity of the hollow fiber membrane may be 94.4% or more, specifically 94.4% to 97%). The variation in the average pore size and the variation in the porosity may be calculated by Mathematical Expression 1 and Mathematical Expression 2 below.

Variation in average pore size (%)=[(average pore size of hollow fiber membrane−average pore size of composite hollow fiber membrane)/average pore size of hollow fiber membrane]×100     [Mathematical Expression 1]

Variation in porosity (%)=[(porosity of hollow fiber membrane−porosity of composite hollow fiber membrane)/porosity of hollow fiber membrane]×100     [Mathematical Expression 2]

In the case in which the ratio of the average pore size of the composite hollow fiber membrane to the average pore size of the hollow fiber membrane is less than 50% (i.e. variation in the average pore size is greater than 50%), humidification performance may be reduced. In the case in which the ratio of the porosity of the composite hollow fiber membrane to the porosity of the hollow fiber membrane is less than 94.4% (i.e. variation in the porosity is greater than 5.6%), humidification performance may be reduced.

A hollow fiber membrane manufacturing method according to another embodiment of the present invention includes a step of preparing a hollow fiber membrane and a step of coating a coating mixture including a pollutant entrapping material on the inner surface of the hollow fiber membrane.

First, a composition for hollow fiber membrane formation including a polymer for hollow fiber membrane formation and a solvent is manufactured.

The polymer for hollow fiber membrane formation is identical to that described in connection with the material for the hollow fiber membrane, and a repetitive description thereof will be omitted.

Examples of the solvent may include N,N-dimethyl acetamide (DMAc), N,N-dimethyl formamide (DMF), N-methyl-2-pyrrolidone (NMP), dimethyl sulfoxide (DMSO), methyl ethyl ketone (MEK), γ-butyrolactone, sulfolane, and 1,3-dimethyl-2-imidazolidinone. However, the present disclosure is not limited thereto.

The polymer for hollow fiber membrane formation may be included in an amount of 10 wt % to 50 wt %, specifically 13 wt % to 38 wt %, based on the total weight of the composition for hollow fiber membrane formation. In the case in which the content of the polymer for hollow fiber membrane formation is less than 10 wt %, manufacturing stability may be reduced. In the case in which the content of the polymer for hollow fiber membrane formation is greater than 50 wt %, humidification performance may be reduced.

The composition for hollow fiber membrane formation may further include an additive. The additive may be any one selected from the group consisting of sorbitol, polyethylene glycol, ethylene glycol, polypropylene glycol, propylene glycol, diethylene glycol, glycerin, lithium chloride, lithium bromide, water, and a mixture thereof.

The manufactured composition for hollow fiber membrane formation is spun and impregnated with an external coagulation solution to manufacture the hollow fiber membrane. At this time, an internal coagulation solution may also be spun.

A spinning nozzle may be a single pipe type nozzle or a multiple pipe type spinning nozzle. In the case in which the multiple pipe type spinning nozzle is used, spinning may be performed in the state in which the composition for hollow fiber membrane formation is injected through an external pipe and the internal coagulation solution is simultaneously injected through an internal pipe. It is preferable that the spinning nozzle be maintained at 50° C. to 150° C. In the case in which the temperature of the spinning nozzle is lower than 50° C., the viscosity of a spinning solution may be greatly increased, whereby spinning may not be smoothly performed. In the case in which the temperature of the spinning nozzle is higher than 150° C., yarn breakage may occur, whereby continuous spinning may be difficult.

The internal coagulation solution serves to form a lumen of the hollow fiber membrane. The internal coagulation solution may be a mixed solution of any one solvent selected from the group consisting of N,N-dimethyl acetamide (DMAc), N,N-dimethyl formamide (DMF), N-methyl-2-pyrrolidone (NMP), dimethyl sulfoxide (DMSO), methyl ethyl ketone (MEK), γ-butyrolactone, sulfolane, 1,3-dimethyl-2-imidazolidinone, and a mixture thereof and an additive selected from the group consisting of sorbitol, polyethylene glycol, ethylene glycol, polypropylene glycol, propylene glycol, diethylene glycol, glycerin, lithium chloride, lithium bromide, water, and a mixture thereof.

In the internal coagulation solution, the weight ratio of the solvent to the additive may be 70:30 to 40:60. In the case in which the weight percentage of the additive is less than 30, finger-shaped macropores may be formed in the entire hollow fiber membrane. In the case in which the weight percentage of the additive is greater than 60, phase transition speed may be low, whereby a hollow fiber membrane having a structure in which the interior of the hollow fiber membrane is clogged may be obtained.

The composition for hollow fiber membrane formation and the internal coagulation solution may be discharged through the spinning nozzle, and may be impregnated with an external coagulation solution so as to be solidified, whereby the hollow fiber membrane may be formed. In the present disclosure, the external coagulation solution is not particularly restricted. For example, the external coagulation solution may be any one selected from the group consisting of water, dibutyl phthalate, dimethyl phthalate, diethyl phthalate, dioctyl phthalate, dioctyl sebacate, glycerol triacetate, polyethylene glycol, ethylene glycol, propylene glycol, diethylene glycol, isopropyl alcohol, methanol, ethanol, and a mixture thereof.

The temperature of a coagulation bath including the external coagulation solution may be maintained at 10° C. to 110° C., specifically 60° C. to 100° C., in order to coagulate the spun hollow fiber membrane. In the case in which the temperature of the coagulation bath is lower than 10° C., the temperature of the composition for hollow fiber membrane formation may be abruptly lowered, whereby it may be difficult to embody a preferable structure. In the case in which the temperature of the coagulation bath is higher than 110° C., the composition for hollow fiber membrane formation may be slowly solidified, whereby yarn breakage may occur.

Optionally, a step of continuously feeding the manufactured hollow fiber membrane into a drawer including a drawing solution so as to be drawn may be further included. In the drawing process, the drawing solution may be any one selected from the group consisting of ethylene glycol, glycerol, polyethylene glycol having a molecular weight of 400 b/mol or less, water, and a mixture thereof.

Drawing may be performed at a drawing temperature of 15° C. to 150° C. at a drawing ratio of 1.1 to 2.0 times. In the case in which the drawing temperature is lower than 15° C., partial drawing may be performed, whereby the hollow fiber membrane may not be uniformly drawn. In the case in which the drawing temperature is higher than 150° C., membrane shrinkage and yarn breakage may occur. In the case in which the drawing ratio is less than 1.1 times the length of the hollow fiber membrane, the effect of process control and strength increase due to drawing is insignificant. In the case in which the drawing ratio is greater than 2.0 times the length of the hollow fiber membrane, the thickness of the membrane may be reduced, whereby the mechanical properties of the membrane may be reduced.

Subsequently, the coating mixture including the pollutant entrapping material is coated on the inner surface of the hollow fiber membrane.

First, the coating mixture including the pollutant entrapping material is manufactured. The coating mixture may be a solution including the pollutant entrapping material dissolved in a solvent or a dispersion including the pollutant entrapping material dispersed in a dispersion medium.

The pollutant entrapping material is identical to that described above, and a repetitive description thereof will be omitted. The solvent or the dispersion medium may be any one selected from the group consisting of isopropyl alcohol, isobutanol, hexanol, N-methylpyrrolidone, dimethylacetamide, dimethyl sulfoxide, dimethylformamide, and a mixture thereof.

The coating mixture may further include an additive. The additive may adjust the pore structure and the porosity of the pollutant entrapping layer in order to prevent pores of the hollow fiber membrane from being blocked by the pollutant entrapping layer or the porosity of the hollow fiber membrane from being changed, whereby it is possible to efficiently entrap the pollutant without a reduction in humidification efficiency.

The additive may be any one selected from the group consisting of methoxyethanol, butoxyethanol, tetrahydrofuran, and pentanol. The additive may adjust the moisture exchange speed of the solvent/dispersion medium to thus adjust the pore size of the pollutant entrapping layer.

The coating mixture may include 70 wt % to 99 wt % of the solvent, 1 wt % to 30 wt % of the pollutant entrapping material, and optionally residual wt % of the additive. In the case in which the content of the pollutant entrapping material is less than 1 wt %, coating may not be performed. In the case in which the content of the pollutant entrapping material is greater than 30 wt %, the coating thickness may be increased, whereby humidification performance may be reduced and required trans-membrane pressure (TMP) may be increased.

Meanwhile, the coating step may include a step of circulating the coating mixture through the lumen of the hollow fiber membrane.

At this time, dry air may be forced to flow outside the hollow fiber membrane, at which the coating mixture does not flow, such that moisture exchange is performed to form the pollutant entrapping layer. As a result, it is possible to prevent pores of the hollow fiber membrane from being blocked by the pollutant entrapping layer or the porosity of the hollow fiber membrane from being changed, whereby it is possible to efficiently entrap the pollutant without deteriorating humidification efficiency.

The coating step may be performed after a hollow fiber membrane module is manufactured. Specifically, a hollow fiber membrane bundle may be prepared using a plurality of hollow fiber membranes, a hollow fiber membrane module having the hollow fiber membrane bundle disposed therein such that a first fluid flows along the lumens of the hollow fiber membranes and a second fluid flows outside the hollow fiber membranes may be manufactured, and then, the coating mixture may be circulated through the lumens of the hollow fiber membranes.

At this time, the dry air may be circulated outside the hollow fiber membranes.

The viscosity of the coating mixture may be 50 cps to 10,000 cps. In addition, the coating mixture may be circulated at a flow rate of 0.1 LPM to 30 LPM, specifically 1 LPM to 10 LPM. In the case in which the viscosity of the coating mixture is less than 50 cps or the circulation speed of the coating mixture is lower than 0.1 LPM, the thickness of the pollutant entrapping layer may be excessively increased. In the case in which the viscosity of the coating mixture is greater than 10,000 cps or the circulation speed of the coating mixture is higher than 30 LPM, coating may not be performed.

Also, in the dry air circulation step, dry air having a temperature of 10° C. to 100° C., specifically 30° C. to 70° C., may be circulated at a flow rate of 1 LPM to 1,000 LPM, specifically 50 LPM to 300 LPM. In the case in which the temperature of the dry air is lower than 10° C., temperature adjustment may be difficult. In the case in which the temperature of the dry air is higher than 100° C., the pollutant entrapping layer may be cracked due to abrupt drying of the pollutant entrapping layer. In the case in which the flow rate of the dry air is lower than 0.1 LPM, drying speed may be low, whereby coating may be nonuniformly performed. In the case in which the flow rate of the dry air is higher than 1,000 LPM, coating may not be performed due to loss of the coating mixture.

A hollow fiber membrane cartridge according to another embodiment of the present disclosure includes a plurality of composite hollow fiber membranes and a body configured to receive the composite hollow fiber membranes therein.

Each of the composite hollow fiber membranes includes a hollow fiber membrane and a pollutant entrapping layer coated on the inner surface of the hollow fiber membrane, the pollutant entrapping layer being configured to remove a pollutant from air that flows along a lumen of the hollow fiber membrane.

In addition, a fuel cell membrane humidifier according to a further embodiment of the present disclosure includes the hollow fiber membrane cartridge.

Figure 2:
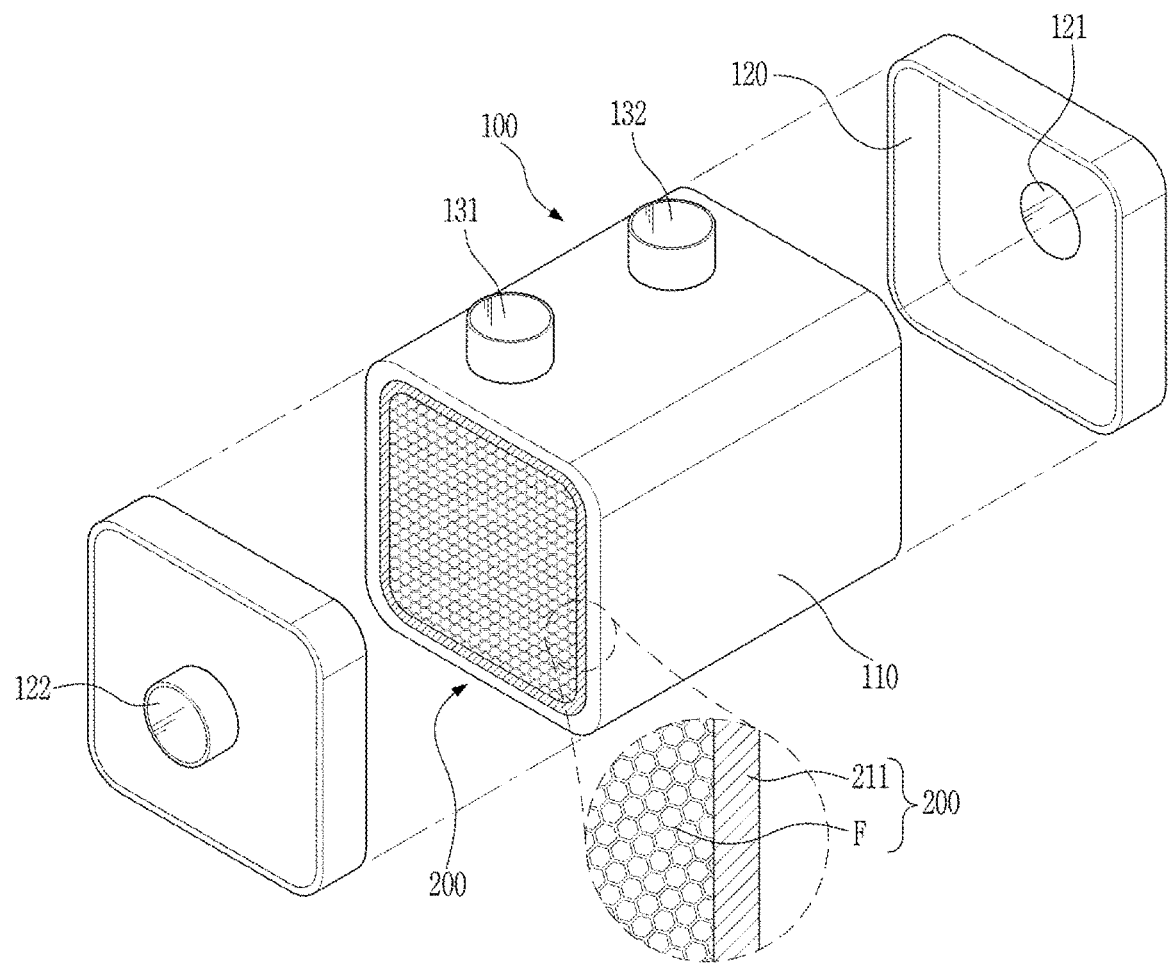
FIGS. 2 to 4 are perspective views schematically showing various modifications of the fuel cell membrane humidifier according to the embodiment of the present disclosure.
Figure 3:
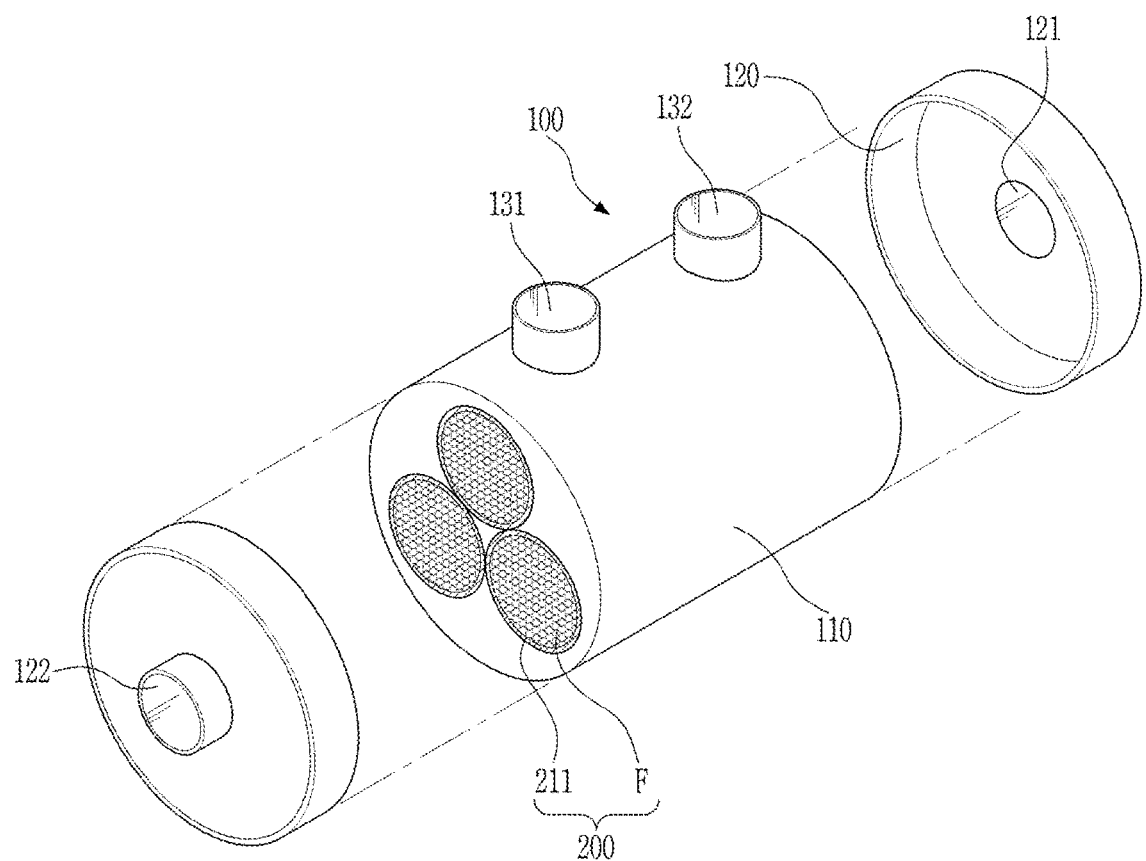
Figure 4:
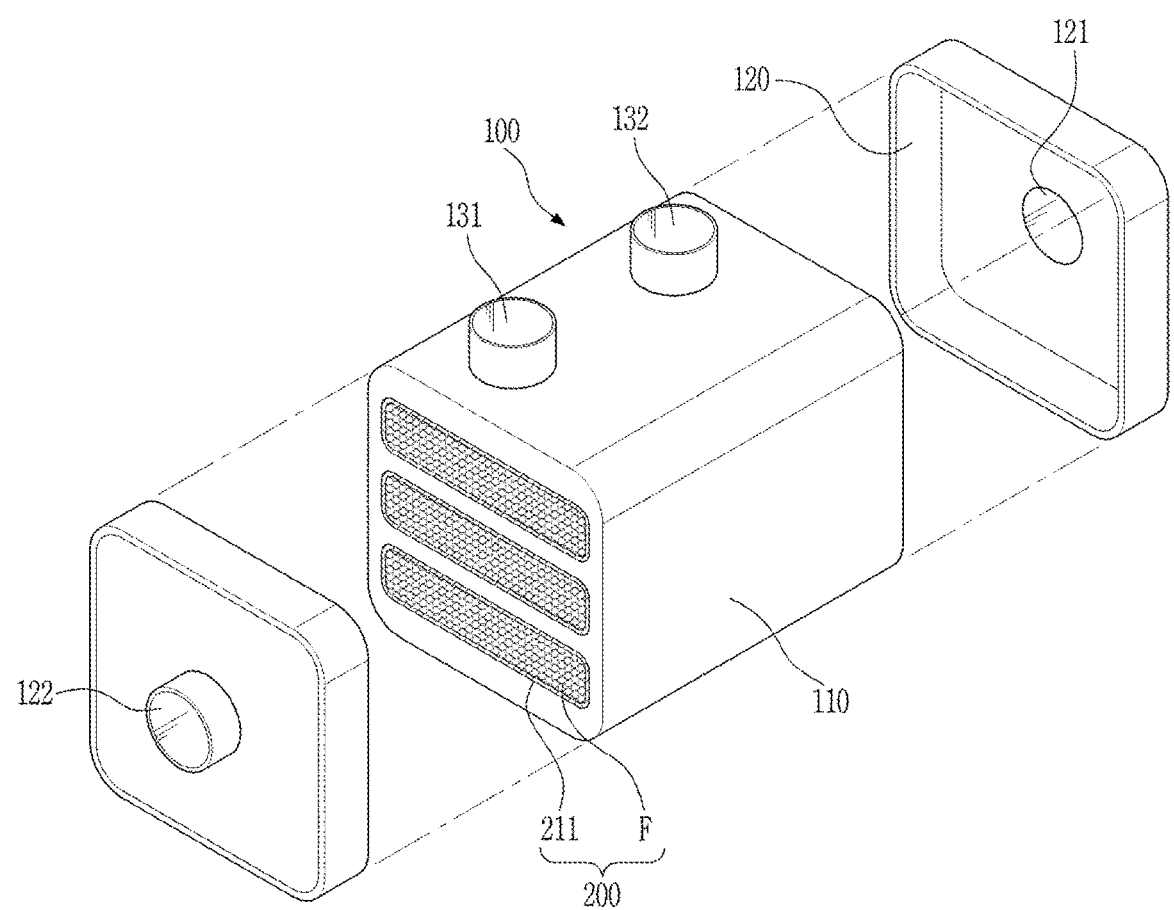
Figure 5:
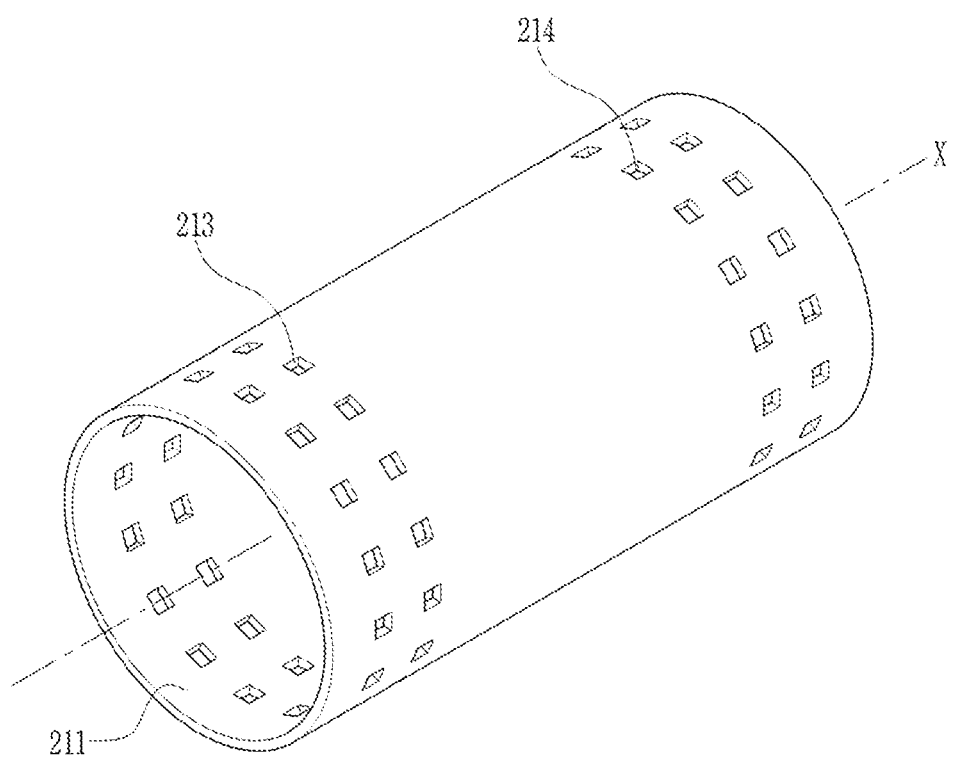
FIG. 5 is a perspective view schematically showing a hollow fiber membrane cartridge according to an embodiment of the present disclosure.

FIG. is a perspective view schematically showing the fuel cell membrane humidifier, FIGS. 2 to 4 are perspective views schematically showing various modifications of the fuel cell membrane humidifier, and FIG. 5 is a perspective view schematically showing the hollow fiber membrane cartridge. Hereinafter, the hollow fiber membrane cartridge and the fuel cell membrane humidifier will be described with reference to FIGS. 1 to 5.

As shown in FIGS. 1 to 4, the fuel cell membrane humidifier according to an embodiment of the present disclosure may include a housing unit 100 and a hollow fiber membrane cartridge 200.

The housing unit 100 defines the external appearance of the membrane humidifier. The housing unit 100 may include a housing body 110 and housing caps 120, which may be integrally coupled to each other. Each of the housing body 110 and the housing caps 120 may be made of hard plastic, such as polycarbonate, or metal.

In addition, the cross-sectional shape of each of the housing body 110 and the housing caps 120 may be a simple closed curve. For example, the cross-sectional shape may be a circle, as shown in FIGS. 1 and 3, or the cross-sectional shape may be a polygon, as shown in FIGS. 2 and 4. The polygon may be a rectangle, a square, a trapezoid, a parallelogram, a pentagon, or a hexagon, and corners of the polygon may be round. In addition, the circle may be an oval.

The housing body 110 is provided with a second fluid inlet 131, through which a second fluid is introduced, and a second fluid outlet 132, through which the second fluid is discharged.

The housing caps 120 are coupled to opposite ends of the housing body 110. A first fluid inlet 121 is formed in one of the housing caps 120, and a first fluid outlet 222 is formed in the other housing cap 120. The first fluid introduced through the first fluid inlet 121 formed in one of the housing caps 120 flows through lumens of the composite hollow fiber membranes F according to the present disclosure, and is discharged outside through the first fluid outlet 122 formed in the other housing cap 220.

The first fluid may be a low-humidity fluid, and the second fluid may be a high-humidity fluid. Alternatively, the second fluid may be a low-humidity fluid, and the first fluid may be a high-humidity fluid.

Each of the composite hollow fiber membranes F includes a hollow fiber membrane and a pollutant entrapping layer coated on one of the outer surface and the inner surface of the hollow fiber membrane, at which the low-humidity air flows, so as to directly contact the low-humidity air, the pollutant entrapping layer being configured to remove a pollutant from the low-humidity air.

The fuel cell membrane humidifier may include a single hollow fiber membrane cartridge 200, as shown in FIGS. 1 and 2, or may include a plurality of hollow fiber membrane cartridges 200, as shown in FIGS. 3 and 4.

As shown in FIGS. 1 to 5, each of the hollow fiber membrane cartridges 200 may include a bundle of composite hollow fiber membranes F and a body portion 211 configured to wrap the bundle of composite hollow fiber membranes. However, the present disclosure is not limited thereto. The fuel cell membrane humidifier may directly include the bundle of composite hollow fiber membranes F in the housing unit 100 without the body portion 211. At this case, the bundle of composite hollow fiber membranes F may be partitioned into a plurality of sub-bundles by partition walls installed in the housing unit 100.

The body portion 211 may define the external appearance of the hollow fiber membrane cartridge 200, and the body portion 211 may be provided with a structure at the outer circumferential surface thereof for the installation thereof in the housing unit 100. In addition, the body portion 211 may have a first mesh portion 213 configured to allow the second fluid introduced through the second fluid inlet 131 to be introduced into the body portion 211 therethrough and a second mesh portion 214 configured to allow the second fluid, after moisture exchange is performed in the hollow fiber membrane cartridge 200, to be discharged from the body portion 211 therethrough. The second fluid discharged through the second mesh portion 214 is discharged out of the membrane humidifier through the second fluid outlet 132.

The body portion 211 may also have a cross section in the form of a simple closed curve (e.g. a circle or a polygon). The polygon may be a rectangle, a square, a trapezoid, a parallelogram, a pentagon, or a hexagon, and corners of the polygon may be round. In addition, the circle may be an oval. Meanwhile, the hollow fiber membrane cartridge 200 is provided at opposite ends thereof with potting units (not shown) configured to bind the bundle of composite hollow fiber membranes F and to fill gaps between the composite hollow fiber membranes F. That is, one end of each of the composite hollow fiber membranes F may be potted to a corresponding one of the potting units. As a result, a channel defined by the lumens of the composite hollow fiber membranes F and a channel defined outside the composite hollow fiber membranes F are separated from each other in the hollow fiber membrane cartridge 200. Each of the potting units may be made of a known material, such as polyurethane. However, the present disclosure is not limited thereto.

Hereinafter, a moisture exchange process between the first fluid and the second fluid in the membrane humidifier constructed as described above will be described. In the following description, the first fluid will be described as being a low-humidity fluid, the second fluid will be described as being a high-humidity fluid, and the pollutant entrapping layer of each of the composite hollow fiber membranes F will be described as being coated on the inner surface of the hollow fiber membrane. However, the present disclosure is not limited thereto. The second fluid may be a low-humidity fluid, the first fluid may be a high-humidity fluid, and the pollutant entrapping layer of each of the composite hollow fiber membranes F may be coated on the outer surface of the hollow fiber membrane.

The first fluid introduced into the housing unit 100 through the first fluid inlet 121 formed in one of the housing caps 120 flows through the lumens of the composite hollow fiber membranes F of the hollow fiber membrane cartridge 200, and is discharged out of the membrane humidifier through the first fluid outlet 122 formed in the other housing cap 220. The second fluid is introduced into the housing body 110 through the second fluid inlet 131 of the housing body 110, flows outside the composite hollow fiber membranes F, and is discharged outside through the second fluid outlet 132 of the housing body 110. At this time, the second fluid, which flows outside the composite hollow fiber membranes F, exchanges moisture with the first fluid, which flows through the lumens of the composite hollow fiber membranes F and which is a low-humidity fluid.

Meanwhile, the first fluid inlet 121 may be closer to the second fluid inlet 131 than the first fluid outlet 122. However, the present disclosure is not limited thereto. The first fluid outlet 122 may be closer to the second fluid inlet 131 than the first fluid inlet 121.

Hereinafter, examples of the present disclosure will be described in detail with reference to the accompanying drawings such that the examples of the present disclosure can be easily implemented by a person having ordinary skill in the art to which the present disclosure pertains. However, the present disclosure may be embodied in various different forms, and is not limited to the examples described herein.

Manufacturing Example: Manufacture of Membrane Humidifier

Example 1

20 wt % of polyethersulfone (PES) and 20 wt % of dimethyl acetamide were introduced into a reaction vessel and were stirred at a temperature of 70° C. for 6 hours to prepare a composition for hollow fiber membrane formation (a dope).

In addition, 50 wt % of water and 50 wt % of DMAC were mixed with each other to prepare an internal coagulation solution for dry and wet spinning. The dope and the coagulation solution were injected into a dual pipe type nozzle to manufacture hollow fiber membranes.

2,000 hollow fiber membranes manufactured as described above were disposed in a prismatic body portion (having a width of 40 mm, a depth of 300 mm, and a height of 200 mm) in the form of a single bundle, opposite ends of the body portion were covered with caps for potting unit formation, and a composition for potting was injected into gaps between the hollow fiber membranes and a gap between the hollow fiber membrane bundle and the body portion and solidified in order to seal the body portion. The caps for potting unit formation were removed, and ends of the solidified composition for hollow fiber membrane potting were cut such that ends of the hollow fiber membrane bundle were exposed from the cut ends of the composition for hollow fiber membrane potting to form potting units, whereby a hollow fiber membrane cartridge was manufactured.

One hollow fiber membrane cartridge manufactured as described above was disposed in a housing, and opposite ends of the housing were covered with housing caps to manufacture a membrane humidifier.

A coating mixture (having a viscosity of 380 cps) having 5 wt % of poly(perfluorosulfonic acid) dispersed in IPA was circulated through the membrane humidifier at a flow rate of 5 LPM (liter per minute) for 20 minutes so as to flow through lumens of the hollow fiber membranes of the manufactured membrane humidifier, and was dried at a temperature of 40° C. for 8 hours to form a pollutant entrapping layer on the inner surface of each of the hollow fiber membranes. At this time, dry air having a temperature of 40° C. and a humidity of 7% was also circulated outside the hollow fiber membranes at a flow rate of 300 LPM.

Each of the composite hollow fiber membranes manufactured as described above included 10 wt % of the pollutant entrapping layer based on the total weight of the composite hollow fiber membrane, and the thickness of the pollutant entrapping layer was 8 µm.

The average pore size of the hollow fiber membranes was 2,300 nm, the average pore size of the composite hollow fiber membranes was 2,100 nm, and the ratio of the average pore size of the composite hollow fiber membranes to the average pore size of the hollow fiber membranes was 91.3%.

In addition, the porosity of the hollow fiber membrane was 80%, the porosity of the composite hollow fiber membrane was 77%, and the ratio of the porosity of the composite hollow fiber membrane to the porosity of the hollow fiber membrane was 96.2%.

Example 2

A membrane humidifier was manufactured in the same manner as in Example 1 except that charcoal was used as the pollutant entrapping material.

Example 3

A membrane humidifier was manufactured in the same manner as in Example 1 except that sulfonated polyethersulfone (S-PES) was used as the pollutant entrapping material.

Comparative Example 1

A membrane humidifier was manufactured in the same manner as in Example 1 except that no pollutant entrapping layer was formed on the inner surface of the hollow fiber membrane.

The average pore size of the hollow fiber membrane was 2,300 nm, and the porosity of the hollow fiber membrane was 80%.

Experimental Example 1: Pollutant Entrapping Performance of Manufactured Membrane Humidifiers Gas entrapping performance of the membrane humidifiers manufactured according to the examples and the comparative example was measured. The results are shown in Table 1 below.

The gas entrapping performance was obtained by introducing air including 1 ppm of NH3 into the membrane humidifiers and measuring NH3 concentration of the air discharged from the membrane humidifiers.

TABLE 1

|  | $NH_3$ concentration of discharged air (ppm) | Gas entrapping efficiency (%) |
| --- | --- | --- |
| Example 1 | 0.1 ppm | 90% |
| Example 2 | 0.28 ppm | 72% |
| Example 3 | 0.11 ppm | 89% |
| Comparative Example 1 | 0.96 ppm | 4% |

Referring to Table 1 above, it can be seen that the membrane humidifiers manufactured according to the examples had better gas entrapping performance than the membrane humidifier manufactured according to the comparative example.

Experimental Example 2: Measurement of Humidification Performance of Manufactured Membrane Humidifiers Dry air flew through the lumens of the composite hollow fiber membranes/the hollow fiber membranes of the membrane humidifiers manufactured according to the examples and the comparative example at a flow rate of 50 g/sec in the state in which a temperature of 70° C. and a humidity of 90% were maintained outside the composite hollow fiber membranes/the hollow fiber membranes and a temperature of 40° C. and a humidity of 10% were maintained in the hollow fiber membranes to perform gas-gas humidification.

The humidification performance was obtained by measuring temperature and humidity at a point from which the air was discharged after flowing in the composite hollow fiber membranes/the hollow fiber membranes and converting the measured temperature and humidity into a dew point. The results are shown in Table 2 below.

TABLE 2

|  | Comparative Example 1 | Example 1 | Example 2 | Example 3 |
|---|---|---|---|---|
| Humidification performance (° C.) | 58 | 58.5 | 58 | 58.9 |

Referring to Table 2 above, it can be seen that the membrane humidifiers manufactured according to the examples had similar humidification performance to or slightly better humidification performance than the membrane humidifier manufactured according to the comparative example.

The invention claimed is:

1. A composite hollow fiber membrane comprising:
   a hollow fiber membrane; and
   a pollutant entrapping layer coated on an inner surface of the hollow fiber membrane, the pollutant entrapping layer being configured to remove a pollutant from air flowing along a lumen of the hollow fiber membrane, the pollutant comprising nitrogen oxide, sulfur oxide, ammonia, or a mixture of two or more thereof,
   wherein the pollutant entrapping layer is present in the composite hollow fiber membrane in an amount of 1 wt % to 50 wt % based on a total weight of the composite hollow fiber membrane.

2. The composite hollow fiber membrane according to claim 1, wherein the pollutant entrapping layer comprises biochar, charcoal, active carbon, or a mixture of two or more thereof.

3. The composite hollow fiber membrane according to claim 1, wherein the pollutant entrapping layer comprises at least one acidic polymer selected from a group consisting of poly(perfluorosulfonic acid), sulfonated polyethersulfone, sulfonated polyarylethersulfone, sulfonated polystyrene, sulfonated polyetherketone, and sulfonated polyetheretherketone.

4. The composite hollow fiber membrane according to claim 1, wherein,
   an average pore size of the hollow fiber membrane is 0.1 nm to 100,000 nm,
   an average pore size of the composite hollow fiber membrane is 0.05 nm to 90,000 nm, and
   a ratio of the average pore size of the composite hollow fiber membrane to the average pore size of the hollow fiber membrane is 50% or more.

5. The composite hollow fiber membrane according to claim 1, wherein,
   a porosity of the hollow fiber membrane is 50% to 90%,
   a porosity of the composite hollow fiber membrane is 45% to 85%, and
   a ratio of the porosity of the composite hollow fiber membrane to the porosity of the hollow fiber membrane is 94.4% or more.

6. A method of manufacturing a composite hollow fiber membrane, the method comprising:
   preparing a hollow fiber membrane; and
   coating a coating mixture comprising a pollutant entrapping material on an inner surface of the hollow fiber membrane in order to remove a pollutant from air flowing along a lumen of the hollow fiber membrane, the pollutant comprising nitrogen oxide, sulfur oxide, ammonia, or a mixture of two or more thereof,
   wherein the coating mixture is a solution including the pollutant entrapping material dissolved in a solvent or a dispersion including the pollutant entrapping material dispersed in a dispersion medium.

7. The method according to claim 6, wherein the pollutant entrapping material comprises at least one acidic polymer selected from a group consisting of poly(perfluorosulfonic acid), sulfonated polyethersulfone, sulfonated polyarylethersulfone, sulfonated polystyrene, sulfonated polyetherketone, and sulfonated polyetheretherketone.

8. The method according to claim 6, wherein the coating mixture comprises 1 wt % to 30 wt % of the pollutant entrapping material based on a total weight of the coating mixture.

9. The method according to claim 6, wherein the coating comprises circulating the coating mixture through the lumen of the hollow fiber membrane.

10. The method according to claim 9, further comprising:
    preparing a hollow fiber membrane bundle using a plurality of hollow fiber membranes; and
    manufacturing a hollow fiber membrane module, the hollow fiber membrane bundle being disposed in the hollow fiber membrane module in such a way that a first fluid flows along the lumens of the hollow fiber membranes and a second fluid flows outside the hollow fiber membranes,
    wherein the coating is performed after the hollow fiber membrane module is manufactured.

11. The method according to claim 9, wherein,
    a viscosity of the coating mixture is 50 to 10,000 cps, and
    the coating mixture is circulated at a flow rate of 0.1 to 30 LPM.

12. The method according to claim 9, wherein the coating further comprises circulating dry air outside the hollow fiber membranes after the circulating the coating mixture.

13. The method according to claim 12, wherein the circulating the dry air is performed by circulating the dry air having a temperature of 10° C. to 150° C. at a flow rate of 1 to 1,000 LPM.

14. A hollow fiber membrane cartridge comprising:
    a plurality of composite hollow fiber membranes; and
    a body portion in which the plurality of composite hollow fiber membranes are accommodated, wherein each of the composite hollow fiber membranes is the composite hollow fiber membrane according to claim 1.

15. A membrane humidifier for a fuel cell, the membrane humidifier comprising:
- a housing unit comprising a first fluid inlet configured to allow a first fluid to be introduced therethrough, a first fluid outlet configured to allow the first fluid to be discharged therethrough, a second fluid inlet configured to allow a second fluid to be introduced therethrough, and a second fluid outlet configured to allow the second fluid to be discharged therethrough; and
- a plurality of composite hollow fiber membranes configured to perform moisture exchange between the first and second fluids, the composite hollow fiber membranes being installed in the housing unit in such a way that the first fluid flows along lumens of the composite hollow fiber membranes and the second fluid flows outside the composite hollow fiber membranes, wherein,
one of the first and second fluids is low-humidity air to be supplied from outside and humidified through the moisture exchange, and each of the composite hollow fiber membranes is the composite hollow fiber membrane according to claim 1.

16. The membrane humidifier according to claim 15, wherein the pollutant entrapping layer comprises biochar, charcoal, active carbon, or a mixture of two or more thereof.

17. The membrane humidifier according to claim 15, wherein,
the first fluid flowing along the lumens of the composite hollow fiber membranes is the low-humidity air.

18. The membrane humidifier according to claim 15, wherein the pollutant entrapping material comprises at least one acidic polymer selected from a group consisting of poly(perfluorosulfonic acid), sulfonated polyethersulfone, sulfonated polyarylethersulfone, sulfonated polystyrene, sulfonated polyetherketone, and sulfonated polyetheretherketone.

19. The membrane humidifier according to claim 15, wherein the pollutant entrapping layer comprises poly(perfluorosulfonic acid) or sulfonated polyethersulfone.

* * * * *